United States Patent
Sekii

(10) Patent No.: US 10,628,709 B2
(45) Date of Patent: Apr. 21, 2020

(54) IMAGE RECOGNITION DEVICE AND IMAGE RECOGNITION METHOD

(71) Applicant: KONICA MINOLTA, INC., Chiyoda-ku (JP)

(72) Inventor: Taiki Sekii, Takatsuki (JP)

(73) Assignee: Konica Minolta, Inc., Tokyo (JP)

( * ) Notice: Subject to any disclaimer, the term of this patent is extended or adjusted under 35 U.S.C. 154(b) by 62 days.

(21) Appl. No.: 15/996,106

(22) Filed: Jun. 1, 2018

(65) Prior Publication Data
US 2018/0357518 A1    Dec. 13, 2018

(30) Foreign Application Priority Data
Jun. 13, 2017    (JP) .................. 2017-115533

(51) Int. Cl.
*G06K 9/62* (2006.01)
*G06T 7/11* (2017.01)
*G06K 9/00* (2006.01)
*G06T 7/187* (2017.01)

(52) U.S. Cl.
CPC ....... *G06K 9/6268* (2013.01); *G06K 9/00369* (2013.01); *G06K 9/00375* (2013.01); *G06T 7/11* (2017.01); *G06T 7/187* (2017.01); *G06T 2207/20081* (2013.01); *G06T 2210/12* (2013.01)

(58) Field of Classification Search
CPC ........... G06K 9/00369; G06K 9/00375; G06K 9/6268; G06T 2207/20081; G06T 2210/12; G06T 2207/10028; G06T 2207/30196; G06T 7/194; G06F 3/017; A63F 13/10
USPC ........ 382/157, 103, 106, 153, 154, 159, 190
See application file for complete search history.

(56) References Cited

U.S. PATENT DOCUMENTS 10,380,759 B2 * 8/2019 Shiozaki ................... G06T 7/73

OTHER PUBLICATIONS

The Cao et al., "Realtime Multi-Person 2D Pose Estimation using Part Affinity Fields", p. 2, https://arxiv.org/pdf/1611.08050, May 13, 2017.
Adrian Bulat et al., "Human pose estimation via Convolutional Part Heatmap Regression", p. 2, https://arxiv.org/pdf/1609.01743, May 13, 2017.

* cited by examiner

*Primary Examiner* — Charlotte M Baker
(74) *Attorney, Agent, or Firm* — Cozen O'Connor

(57) ABSTRACT

An image recognition device includes: a hardware processor that: conducts machine learning, to perform a first process of calculating a plurality of region candidates for a region showing part of an object captured in an image, and a second process of determining a size of each of the region candidates in accordance with the object captured in the image; and determines the region from among the region candidates, using a predetermined criterion.

6 Claims, 8 Drawing Sheets

IMAGE RECOGNITION DEVICE AND IMAGE RECOGNITION METHOD

The entire disclosure of Japanese patent Application No. 2017-115533, filed on Jun. 13, 2017, is incorporated herein by reference in its entirety.

BACKGROUND

Technological Field

The present invention relates to a technology for image recognition using machine learning.

Description of the Related Art

Techniques for detecting the position of joints of a person by analyzing an image of the person through machine learning, and estimating the posture of the person from the positions of the joints are disclosed by Adrian Bulat and one other person in "Human pose estimation via Convolutional Part Heatmap Regression", [online], p. 2, [search date: May 13, 2017], Internet <URL: https://arxiv.org/pdf/1609.01743>, and Zhe Cao and three others in "Realtime Multi-Person 2D Pose Estimation using Part Affinity Fields", [online], p. 2, [search date: May 13, 2017], Internet <URL: https://arxiv.org/pdf/1611.08050>, for example. According to the techniques disclosed in these literatures, a likelihood map in which the likelihoods of joint positions are calculated pixel by pixel is created. Therefore, the amount of calculation is large, and it is difficult to detect joint positions at high speed.

YOLO (You only look once) is known as one of image recognition techniques that require relatively small amounts of calculation. In YOLO, an image is divided into grids (7×7 pixels, for example), and a rectangular region (a region showing an object) called a bounding box circumscribing the object is set in the grid where the object (such as a person) exists.

In a case where the recognition target is an object, the range is clear, and accordingly, it is easy to define a bounding box. In a case where the recognition target is part of an object, such as the head of a person, the range is clear, and accordingly, it is easy to define a bounding box. However, a joint does not have a clear range, for example. Therefore, it is difficult to define a bounding box, and joints are regarded as points in image recognition.

SUMMARY

An object of the present invention is to provide an image recognition device and an image recognition method capable of reducing the amount of calculation and setting a region showing a recognition target in an image even if the range of the recognition target is not clear.

To achieve the abovementioned object, according to an aspect of the present invention, an image recognition device reflecting one aspect of the present invention comprises: a hardware processor that: conducts machine learning, to perform a first process of calculating a plurality of region candidates for a region showing part of an object captured in an image, and a second process of determining a size of each of the region candidates in accordance with the object captured in the image; and determines the region from among the region candidates, using a predetermined criterion.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
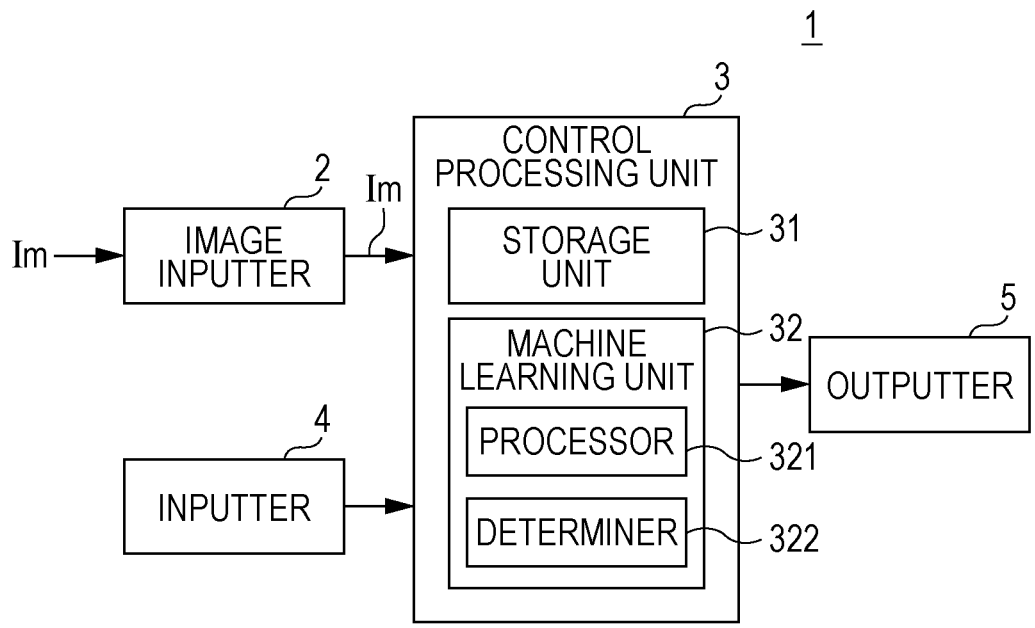
FIG. 1 is a functional block diagram showing an image recognition device according to an embodiment.

Hereinafter, one or more embodiments of the present invention will be described in detail with reference to the drawings. However, the scope of the invention is not limited to the disclosed embodiments. In the drawings, like components are denoted by like reference numerals. In the description below, explanation of components that have already been described will not be repeated. In this specification, general terms are accompanied by reference numerals without suffixes ("image Im", for example), and individual components are denoted by reference numerals with suffixes ("image Im-1", for example).

FIG. 1 is a functional block diagram showing an image recognition device 1 according to an embodiment. The image recognition device 1 is a personal computer, a smartphone, a tablet terminal, or the like, and includes an image inputter 2, a control processing unit 3, an inputter 4, and an outputter 5 as functional blocks.

An image Im (an image Im-1 shown in FIG. 4, for example) is input to the image inputter 2 from the outside of the image recognition device 1. The image inputter 2 sends the input image Im to the control processing unit 3.

The control processing unit 3 includes a storage unit 31 and a machine learning unit 32 as functional blocks. The image Im sent from the image inputter 2 is stored into the storage unit 31.

The machine learning unit 32 detects the position of each joint of a person 101 (such as a person 101-1 shown in FIG. 4) captured in the image Im, and, in accordance with the detected position of each joint, estimates the position of the person 101. In the embodiment, the right shoulder joint is described as an example of a joint. Since a known technique can be used in estimating a posture of the person 101 in accordance with the detected position of each joint, explanation of the estimating process is not made herein.

Machine learning generally includes a learning phase (creating a model through learning) and a prediction/recognition phase (obtaining a result by applying the model to data). The machine learning unit 32 that conducts machine learning includes a processor 321 and a determiner 322 as functional blocks. The processor 321 conducts machine learning to perform a first process of calculating region candidates that are candidates for regions showing part of the object captured in the image (calculating the right shoulder joint region candidates 105-1 through 105-5 shown in FIG. 5), and a second process of determining the size of each of the region candidates from the object captured in the image Im. This is the prediction/recognition phase (the learning phase will be described later). In the embodiment, the person 101 is taken as an example, and the right shoulder joint of the person 101 is described as an example of part of the object. The right shoulder joint region (a right shoulder joint region 107-1 shown in FIG. 6, for example) captured in the image Im is the region indicating the right shoulder joint.

The determiner 322 determines a region (a right shoulder joint region 107) from among the region candidates (right shoulder joint region candidates 105) determined by the processor 321, using a predetermined criterion. For example, the determiner 322 determines the region candidate (a right shoulder joint region candidate 105) having the highest likelihood to be the region (the right shoulder joint region 107). The determiner 322 outputs the center of the region (the right shoulder joint region 107) as a feature point. The output feature point indicates the position of the right shoulder joint, and is used in estimating the posture of the person 101 by the machine learning unit 32.

The inputter 4 is a device that inputs commands (instructions), data, and the like from the outside to the image recognition device 1. As will be described later, in a case where the machine learning unit 32 is made to execute the prediction/recognition phase (the first process and the second process described above), if one person is captured in the image, the operator of the image recognition device 1 inputs a command for setting "one person" in the machine learning unit 32 to the inputter 4. If two or more persons are captured in the image, the operator inputs a command for setting "two or more persons" in the machine learning unit 32 to the inputter 4. The outputter 5 is a device that outputs the result (the posture of the person 101 captured in the image Im, for example) of image recognition performed by the image recognition device 1.

Figure 2:
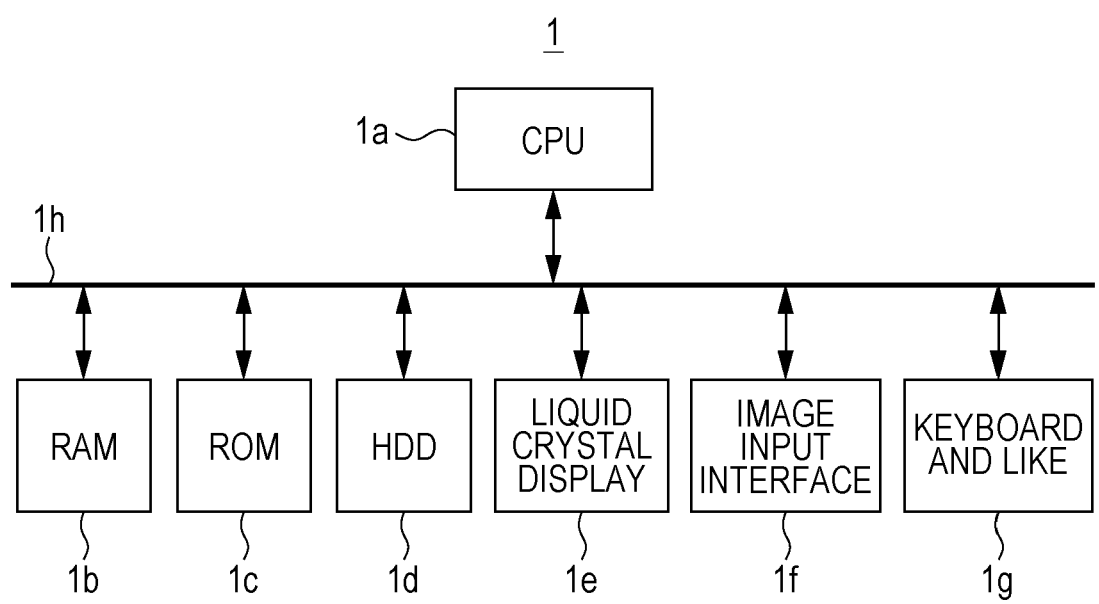
FIG. 2 is a block diagram showing the hardware configuration of the image recognition device shown in FIG. 1.

FIG. 2 is a block diagram showing the hardware configuration of the image recognition device 1 shown in FIG. 1. The image recognition device 1 includes a central processing unit (CPU) 1a, a random access memory (RAM) 1b, a read only memory (ROM) 1c, a hard disk drive (HDD) 1d, a liquid crystal display 1e, an image input interface 1f, a keyboard and the like 1g, and a bus 1h that connects these components. The liquid crystal display 1e is hardware that forms the outputter 5.

Instead of the liquid crystal display 1e, an organic electroluminescence (EL) display, a plasma display, or the like may be used. The image input interface if is hardware that forms the image inputter 2. The keyboard and the like 1g is hardware that forms the inputter 4. Instead of the keyboard, a touch panel may be used.

The HDD 1d is hardware that forms the storage unit 31. The HDD 1d stores programs for implementing the functional blocks of the processor 321 and the determiner 322, respectively. These programs are expressed with the use of the definitions of the functional blocks. The determiner 322 and a determination program are now described as an example. The determiner 322 determines a region from among the region candidates, using the predetermined criterion. The determination program is a program for determining a region from among the region candidates with the use of the predetermined criterion.

These programs are stored beforehand in the HDD 1d, but the present invention is not limited to this. For example, a recording medium (an external recording medium such as a magnetic disk or an optical disk) in which these programs are recorded is prepared, and the programs recorded in the recording medium may be stored into the HDD 1d. Alternatively, these programs may be stored in a server connected to the image recognition device 1 via a network. In such a case, these programs may be sent to the HDD 1d via the network, and be stored into the HDD 1d. These programs may be stored into the ROM 1c, instead of the HDD 1d. The image recognition device 1 may include a flash memory, instead of the HDD 1d, and these programs may be stored into the flash memory.

The CPU 1a reads these programs from the HDD 1d, loads the programs in the RAM 1b, and executes the loaded programs, to form the processor 321 and the determiner 322. However, as for the functions of the processor 321 and the functions of the determiner 322, a part or all of each function may be realized by a process to be performed by a digital signal processor (DSP), instead of or in combination with a process to be performed by the CPU 1a. Likewise, part or all of each function may be realized by a process to be performed by a dedicated hardware circuit, instead of or in combination with a process to be performed by software.

Flowcharts according to these programs (a processing program, a determination program, and the like) to be executed by the CPU 1a are the later described flowcharts shown in FIGS. 3 and 7.

In the learning phase, the machine learning unit 32 learns to detect the right shoulder joint region, using a large number (at least two) of images in which one or more persons are captured and a region surrounding the right shoulder joint of a person (or a region overlapping the right shoulder joint of a person) is set. At this stage, the machine learning unit 32 performs a process of determining the size of each side of the right shoulder joint region to be 0.4 times larger than the rectangular region (a bounding box) circumscribing the head of a person captured in the images. The machine learning unit 32 performs this process on the large number (at least two) of images. By constructing such a learning model, the machine learning unit 32 can calculate right shoulder joint region candidates from an image showing one or more persons, and also predict the size of each side of each of the right shoulder joint region candidates (the predicted size is 0.4 times the bounding box surrounding the head) from the image, without detecting the head of a person captured in the image (that is, the bounding box around the head is not set), in the prediction/recognition phase.

The learning phase to be executed by the machine learning unit 32 is generalized as follows. The machine learning unit 32 conducts machine learning to perform a third process of detecting a region showing part of an object by using images in which the region is set and the object is captured, and a fourth process that is a process of determining the size of the region from the object captured in the image (for example, a process of determining the size of the region to be a size having a positive correlation with the size that can be defined by the object captured in the image is performed on each of the images). In this manner, the machine learning unit 32 constructs the learning model in advance.

Next, the prediction/recognition phase is described. The image recognition device 1 performs different processes in a case where one person 101 is captured in the image Im, and in a case where two or more persons 101 are captured in the image Im. Referring now to FIG. 3, the former case is described. FIG. 3 is a flowchart for explaining the prediction/recognition phase of machine learning, which is executed in a case where one person 101 is captured in the image Im.

Figure 4:
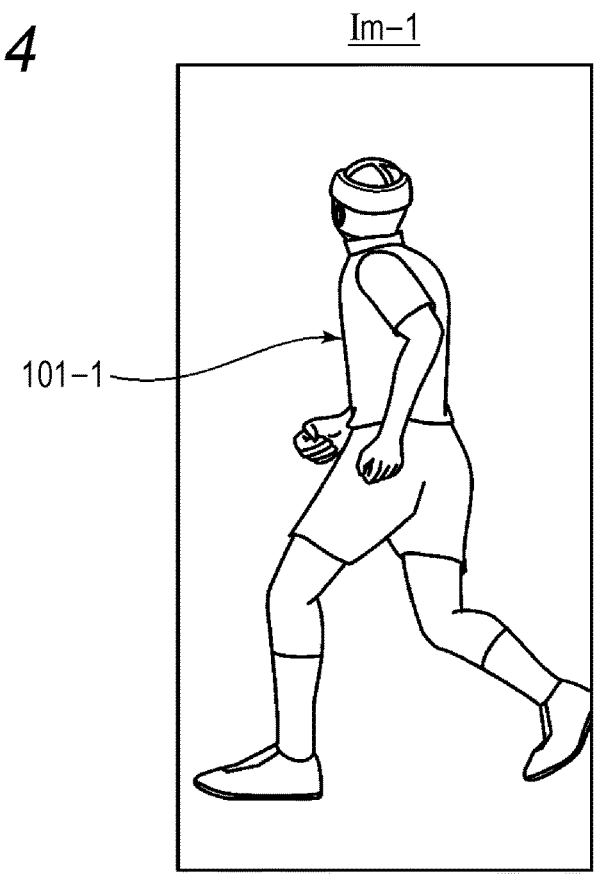
FIG. 4 is a schematic diagram showing an example of an image in which one person is captured.

FIG. 4 is a schematic diagram showing an example of the image Im-1 in which one person 101 is captured. The number of persons 101 in the image Im-1 is one (singular). The image Im-1 is stored into the storage unit 31 via the image inputter 2. The image Im-1 shown in FIG. 4 is an image Im that is to be subjected to the prediction/recognition phase of machine learning.

The operator of the image recognition device 1 operates the inputter 4, to input a command for setting information indicating that one person 101 is captured in the image Im-1, in the processor 321. As a result, information indicating that one person 101 is captured in the image Im-1 is set in the processor 321 (step S1 in FIG. 3). The machine learning unit 32 recognizes that one person 101 is captured in the image Im-1, and executes the prediction/recognition phase.

Figure 3:
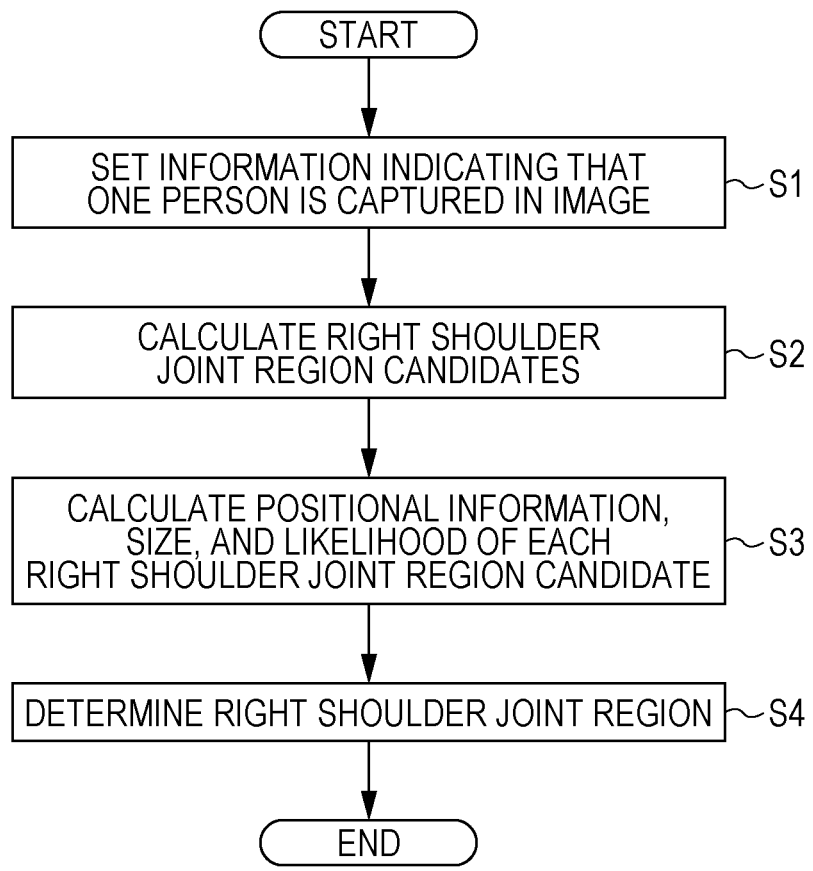
FIG. 3 is a flowchart for explaining a prediction/recognition phase of machine learning, which is executed in a case where one person is captured in an image.
Figure 5:
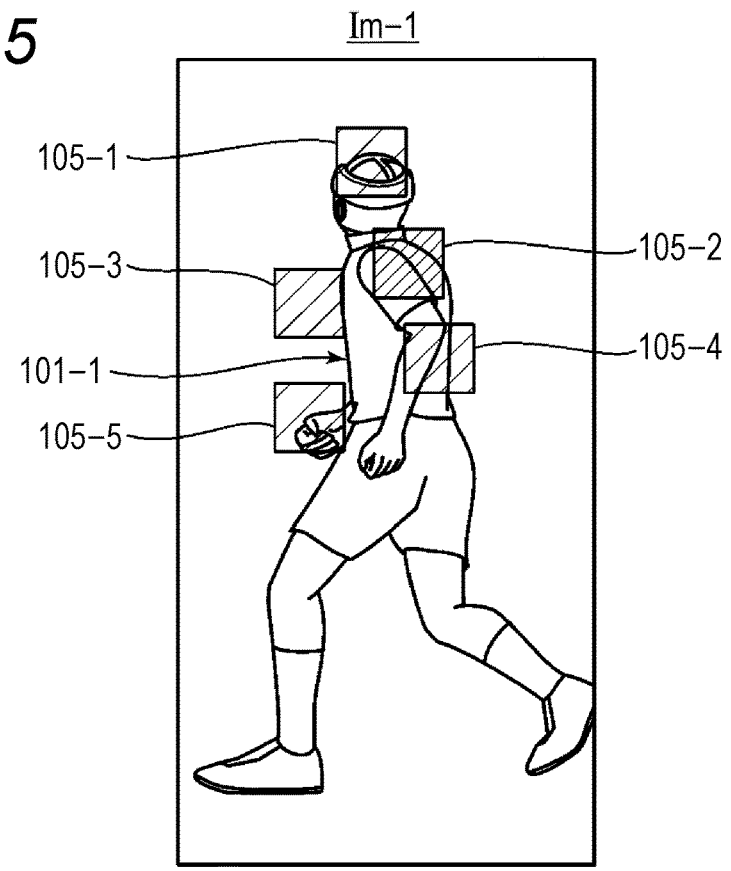
FIG. 5 is a schematic diagram showing an image including five right shoulder joint region candidates.

The processor 321 reads the image Im-1 stored in the storage unit 31, inputs the image Im-1 to the above described learning model, calculates right shoulder joint region candidates 105 (step S2 in FIG. 3), and calculates the positional information, the size, and the likelihood (probability) for each of the right shoulder joint region candidates 105 (step S3 in FIG. 3). The size is the size of one side of each corresponding right shoulder joint region candidate 105. In the processing in steps S2 and S3, a convolutional neural network (CNN) is used, for example. In this example, the number of right shoulder joint region candidates 5 is five. FIG. 5 is a schematic diagram showing the image Im-1 including the five right shoulder joint region candidates 105-1 through 105-5. The right shoulder joint region candidates 105 are candidates for the right shoulder joint region 107. Positional information, a size, and a likelihood (probability) are given to each of the right shoulder joint region candidates 105. The positional information indicates the position of the corresponding right shoulder joint region candidate 105 in the image Im-1. If the likelihood is high, the possibility that the right shoulder joint region candidate 105 is the right shoulder joint region 107 is high. If the likelihood is low, the possibility that the right shoulder joint region candidate 105 is the right shoulder joint region 107 Is low. In FIG. 5, the densities of hatching in the right shoulder joint region candidates 105 indicate the degrees of likelihood. If the density of hatching is high, the likelihood is high. If the density of hatching is low, the likelihood is low.

Figure 6:
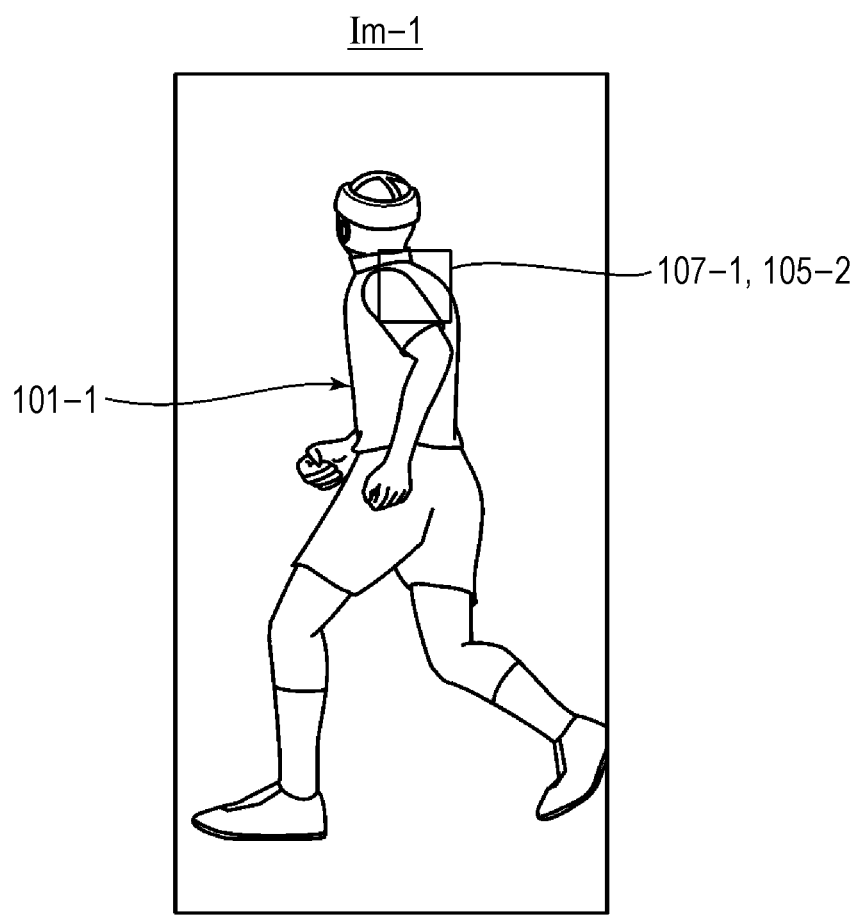
FIG. 6 is a schematic diagram showing an image including a right shoulder joint region.

The determiner 322 determines that the right shoulder joint region 107 is the right shoulder joint region candidate 105 having the highest likelihood among the right shoulder joint region candidates 105 (the five right shoulder joint region candidates 105-1 through 105-5 shown in FIG. 5) calculated in step S3 (step S4 in FIG. 3). FIG. 6 is a schematic diagram showing the image Im-1 including the right shoulder joint region 107. The right shoulder joint region candidate 105-2 is determined to be the right shoulder joint region 107-1 of the person 101-1.

As described above, the image recognition device 1 predicts and determines the size of the right shoulder joint region 107 showing the right shoulder joint of the person 101-1 captured in the image Im, from the external appearance of the person 101-1 captured in the image Im. Thus, the right shoulder joint region 107 showing the right shoulder joint can be set in the image Im, even if the range of the right shoulder joint is not clear. Further, in the image recognition device 1, the right shoulder joint is not detected pixel by pixel, but is detected for each right shoulder joint region candidate 105 shown in FIG. 5. Thus, the amount of calculation in machine learning can be reduced.

Figure 7:
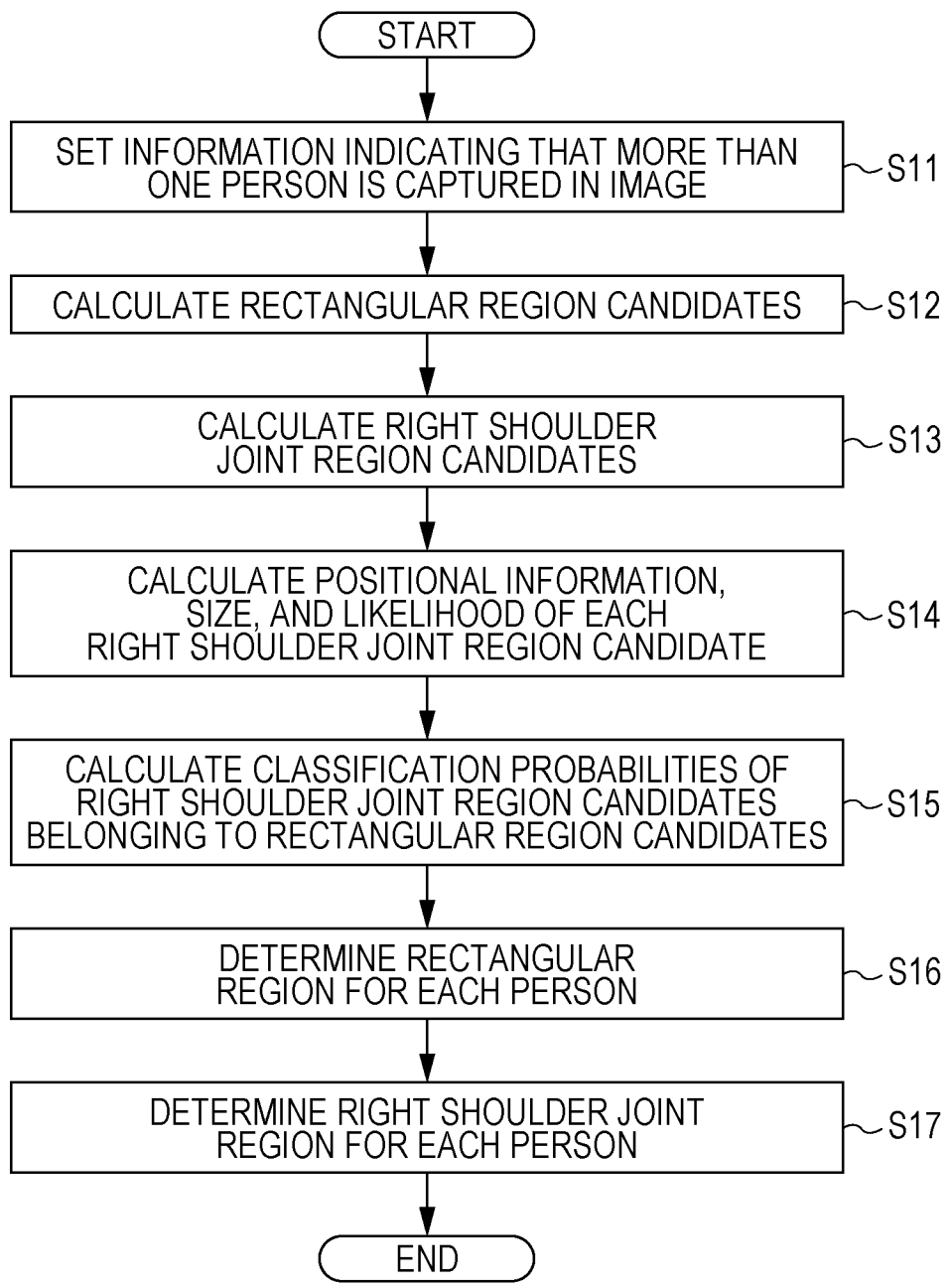
FIG. 7 is a flowchart for explaining a prediction/recognition phase of machine learning, which is executed in a case where two or more persons are captured in an image.

Referring now to FIG. 7, the process to be performed in a case where two or more persons 101 are captured in the image Im is described. FIG. 7 is a flowchart for explaining the prediction/recognition phase of machine learning, which is executed in a case where two or more persons 101 are captured in the image Im.

Figure 8:
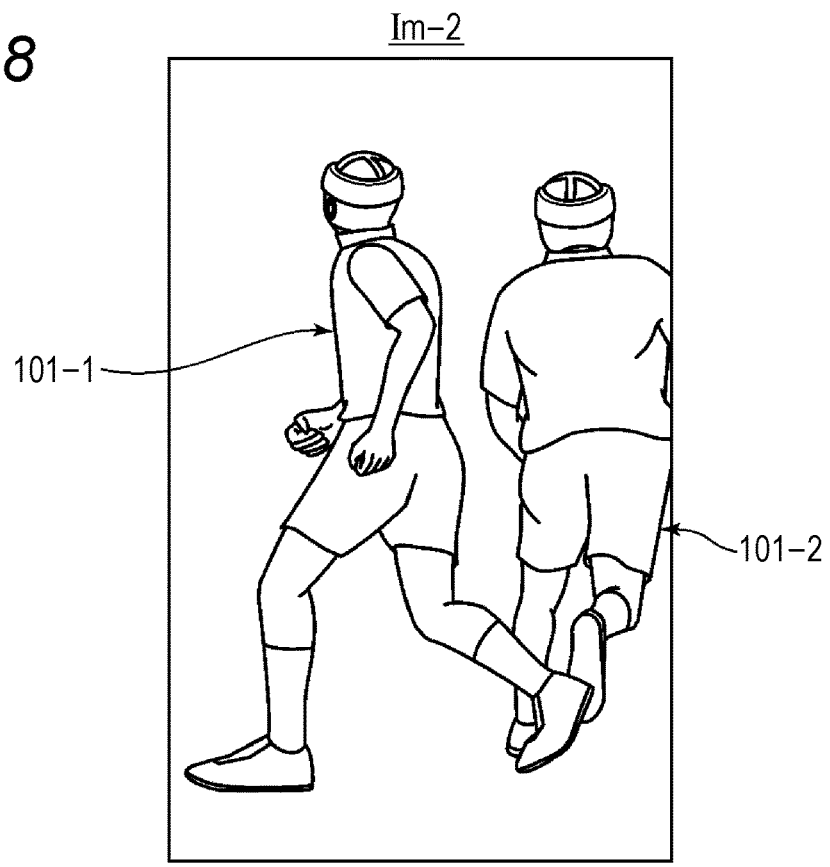
FIG. 8 is a schematic diagram showing an example of an image in which two or more persons are captured.

FIG. 8 is a schematic diagram showing an example of an image Im-2 in which two or more persons 101 are captured. In this example, the number of persons 101 captured in the image Im-2 is two. The image Im-2 is stored into the storage unit 31 via the image inputter 2. The image Im-2 shown in FIG. 8 is an image Im to be subjected to the prediction/recognition phase of machine learning.

The operator of the image recognition device 1 operates the inputter 4, to input a command for setting information indicating that two or more persons 101 are captured in the image Im-2, in the processor 321. As a result, information indicating that two or more persons 101 are captured in the image Im-2 is set in the processor 321 (step S11 in FIG. 7). The machine learning unit 32 recognizes that two or more persons 101 are captured in the image Im-2, and executes the prediction/recognition phase.

Figure 9:
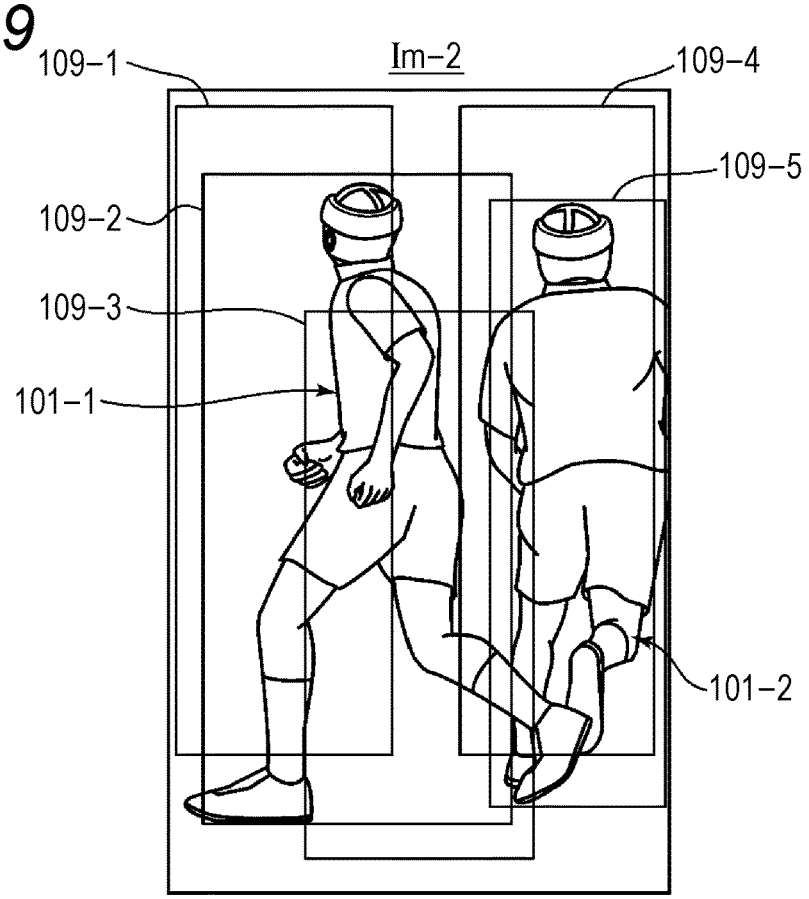
FIG. 9 is a schematic diagram showing an image including two or more rectangular region candidates.

The processor 321 conducts machine learning, to perform a process of calculating rectangular region candidates 109 for each of the persons 101-1 and 101-2 that are captured in the image Im-2 (step S12 in FIG. 7). FIG. 9 is a schematic diagram showing the image Im-2 including two or more rectangular region candidates 109. In this example case, the number of rectangular region candidates 109 is five. The rectangular region candidates 109-1, 109-2, and 109-3 are candidates for a rectangular region 111 (a bounding box) circumscribing the person 101-1. The rectangular region candidates 109-4 and 109-5 are candidates for the rectangular region 111 (a bounding box) circumscribing the person 101-2.

Figure 10:
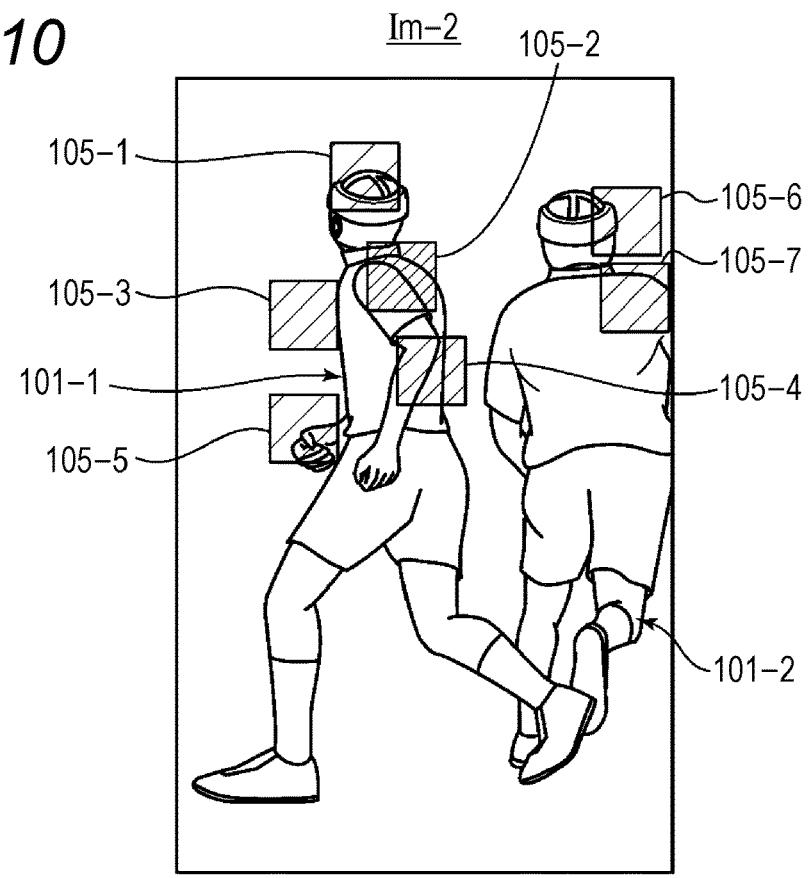
FIG. 10 is a schematic diagram showing an image including seven right shoulder joint region candidates.

The processor 321 inputs the image Im-2 to the above described learning model, calculates the right shoulder joint region candidates 105 of the persons 101 included in the image Im-2 (step S13 in FIG. 7), and calculates the positional information, the size, and the likelihood (probability) of each of the right shoulder joint region candidates 105 (step S14 in FIG. 7). The size is the size of one side of each corresponding right shoulder joint region candidate 105. In the processing in steps S13 and S14, a convolutional neural network (CNN) is used, for example. In this example, the number of right shoulder joint region candidates 5 is seven. FIG. 10 is a schematic diagram showing the image Im-2 including the seven right shoulder joint region candidates 105-1 through 105-7. As described above in the case where there is only one person 101 captured in the image Im, positional information and a likelihood (probability) are given to each of the right shoulder joint region candidates 105. In FIG. 10, the densities of hatching in the right shoulder joint region candidates 105 indicate the degrees of likelihood, as in FIG. 5. If the density of hatching is high, the likelihood is high. If the density of hatching is low, the likelihood is low.

Through machine learning, the processor 321 calculates a classification probability indicating to which one of the five rectangular region candidates 109-1 through 109-5 shown in FIG. 9 a right shoulder joint region candidate 105 belongs (step S15 in FIG. 7). The processor 321 performs this calculation for each of the seven right shoulder joint region candidates 105-1 through 105-7 shown in FIG. 10. Where the right shoulder joint region candidate 105-1 is taken as an example, the processor 321 calculates the classification probability indicating which one of the five rectangular region candidates 109-1 through 109-5 the right shoulder joint region candidate 105-1 belongs.

Figure 11:
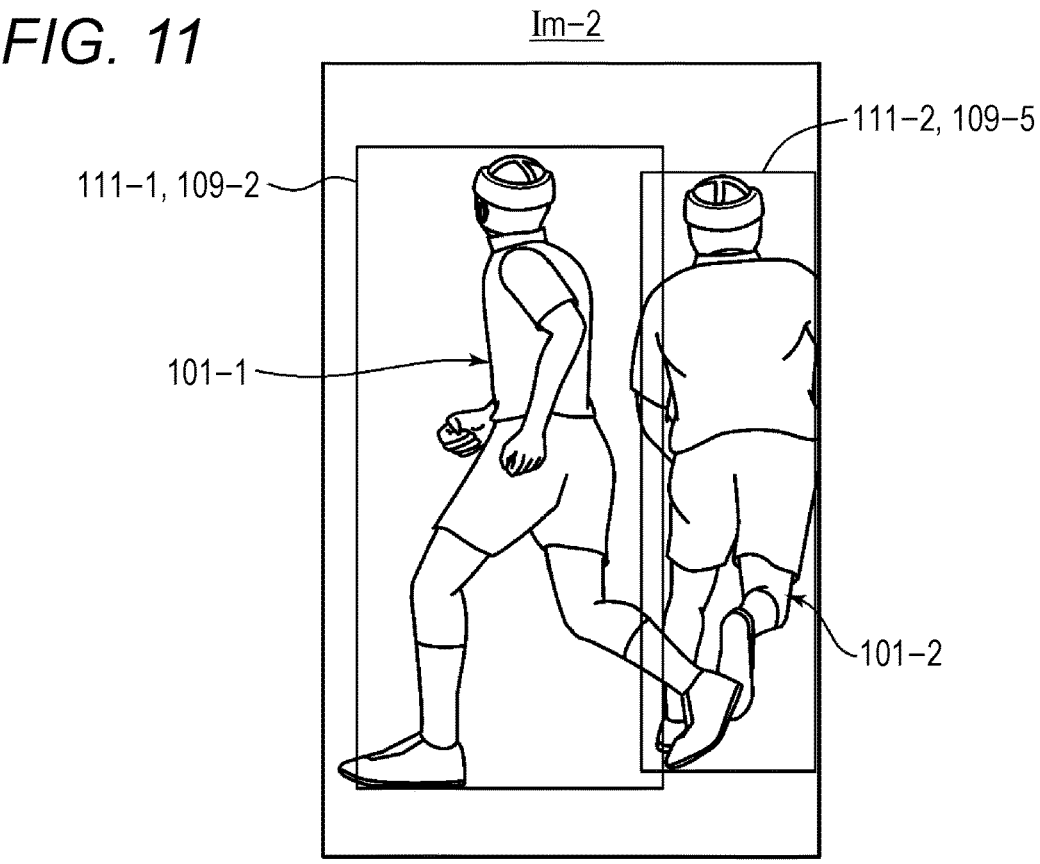
FIG. 11 is a schematic diagram showing an image including rectangular regions circumscribing persons.

The processor 321 determines the rectangular region 111-1 circumscribing the person 101-1 from among the five rectangular region candidates 109-1 through 109-5 shown in FIG. 9, and determines the rectangular region 111-2 circumscribing the person 101-2 from among the five rectangular region candidates 109-1 through 109-5 (step S16 in FIG. 7). FIG. 11 is a schematic diagram showing the image Im-2 including the rectangular regions 111 circumscribing the person 101. The rectangular region candidate 109-2 is determined to be the rectangular region 111-1 circumscribing the person 101-1, and the rectangular region candidate 109-5 is determined to be the rectangular region 111-2 circumscribing the person 101-2. In this determination, a non-maximum suppression process is used, for example. Specifically, the processor 321 selects a rectangular region candidate 109 having a high likelihood from among the five rectangular region candidates 109-1 through 109-5 for the rectangular region circumscribing the person 101-1. If the selected rectangular region candidate 109 does not overlap any other rectangular region candidate 109 having a higher likelihood than that, the processor 321 determines the selected rectangular region candidate 109 to be the rectangular region 111-1 circumscribing the person 101-1. The processor 321 determines the rectangular region 111-2 circumscribing the person 101-2 in the same manner as above.

Figure 12:
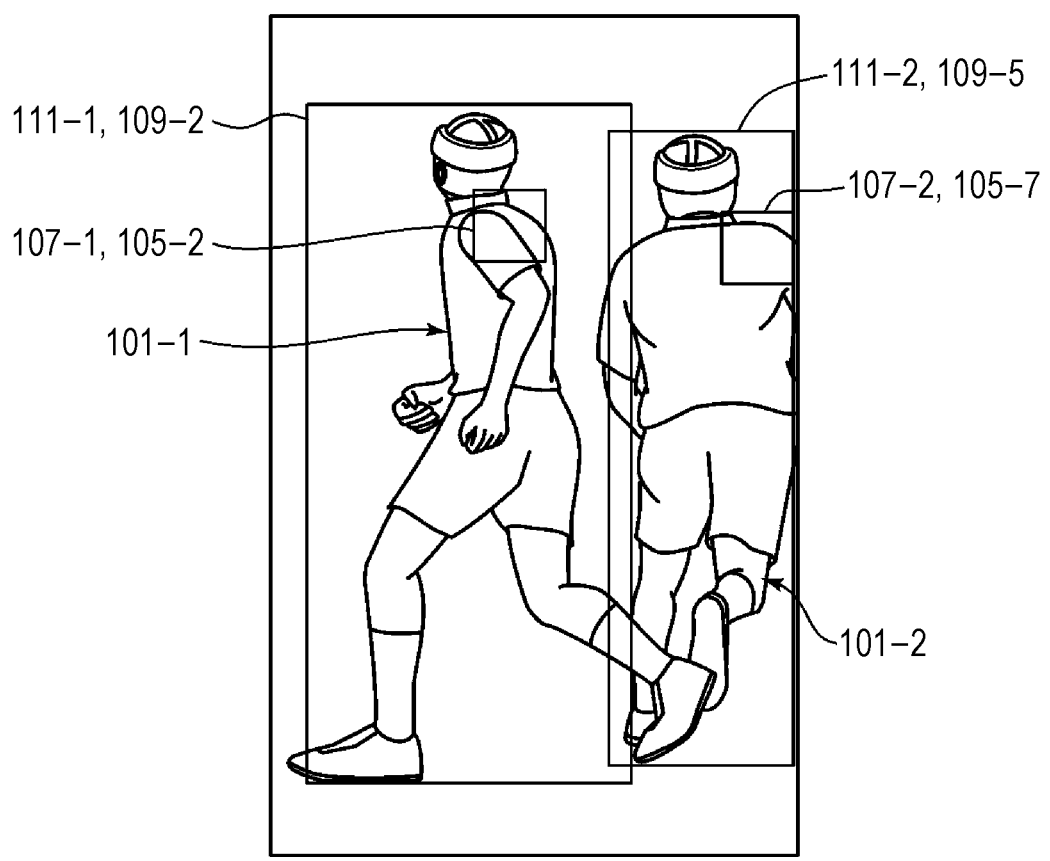
FIG. 12 is a schematic diagram showing an image including rectangular regions circumscribing persons and right shoulder joint regions.

The determiner 322 determines a right shoulder joint region 107 for each of the persons 101-1 and 101-2 (step S17 in FIG. 7). FIG. 12 is a schematic diagram showing the image Im-2 including the rectangular regions 111 circumscribing the persons 101 and the right shoulder joint regions 107. The right shoulder joint region candidate 105-2 is determined to be the right shoulder joint region 107-1 of the person 101-1, and the right shoulder joint region candidate 105-7 is determined to be the right shoulder joint region 107-2 of the person 101-2.

A method of determining the right shoulder joint regions 107 is now described in detail. For each of the seven right shoulder joint region candidates 105-1 through 105-7 shown in FIG. 10, the determiner 322 calculates the product of the classification probability that the right shoulder joint region candidate 105 belongs to the rectangular region 111-1 (the rectangular region candidate 109-2) and the likelihood of the right shoulder joint region candidate 105. The determiner 322 then determines that the right shoulder joint region candidate 105 with the largest product is the right shoulder joint region 107-1 belonging to the rectangular region 111-1 (or the right shoulder joint region 107-1 of the person 101-1). Likewise, for each of the seven right shoulder joint region candidates 105-1 through 105-7, the determiner 322 calculates the product of the classification probability that the right shoulder joint region candidate 105 belongs to the rectangular region 111-2 (the rectangular region candidate 109-5) and the likelihood of the right shoulder joint region candidate 105. The determiner 322 then determines that the right shoulder joint region candidate 105 with the largest product is the right shoulder joint region 107-2 belonging to the rectangular region 111-2 (or the right shoulder joint region 107-2 of the person 101-2).

The classification probability that a right shoulder joint region candidate 105 belongs to the rectangular region 111-1 is the classification probability that the right shoulder joint region candidate 105 belongs to the rectangular region candidate 109-2. The classification probability that a right shoulder joint region candidate 105 belongs to the rectangular region 111-2 is the classification probability that the right shoulder joint region candidate 105 belongs to the rectangular region candidate 109-5. These classification probabilities have already been calculated in step S15.

In a case where the number of persons 101 captured in the image Im-2 is two or larger, the right shoulder joint regions 107 of the two or more persons cannot be determined only from the likelihoods. Therefore, in the image recognition device 1, a right shoulder joint region 107 is determined for each of the two or more persons 101 captured in the image Im-2, in accordance with the classification probabilities and the likelihoods (the right shoulder joint region 107 belonging to a rectangular region 111 is determined for each of the two or more rectangular regions 111).

Although embodiments of the present invention have been described and illustrated in detail, the disclosed embodiments are made for purposes of illustration and example only and not limitation. The scope of the present invention should be interpreted by terms of the appended claims.

What is claimed is:

1. An image recognition device comprising:
a hardware processor that:
conducts machine learning, to perform a first process of calculating a plurality of region candidates for a region showing a part of an object captured in an image, the part of the object being a portion where an outline of a recognition target is not clear, the part of the object that is the recognition target being recognized as a bounding box, and a second process of determining a size of each of the region candidates in accordance with the object captured in the image; and
determines the region from among the region candidates, using a predetermined criterion.

2. The image recognition device according to claim 1, wherein the hardware processor stores a learning model in advance, and performs the first process and the second process by using the learning model, the learning model being constructed by the hardware processor performing a third process of detecting the region by using a plurality of images in which the region is set and the object is captured, and a fourth process of performing, for each of the images, a process of determining a size of the region in accordance with the object captured in the image, the third process and the fourth process being performed through machine learning.

3. An image recognition device comprising:
a hardware processor that:
conducts machine learning, to perform a first process of calculating a plurality of region candidates for a region showing part of an object captured in an image, and a second process of determining a size of each of the region candidates in accordance with the object captured in the image, and determines the region from among the region candidates, using a predetermined criterion; and an inputter that receives an input of a command for setting information indicating that the object is a single object in the hardware processor from an operator of the image recognition device, when the object captured in the image is a single object in a case where the hardware processor is made to perform the first process and the second process, wherein the hardware processor further:

conducts machine learning, to perform a process of calculating a likelihood that a region candidate is the region, the process being performed for each of the region candidates, and determines that the region candidate having the highest likelihood among the region candidates is the region.

4. The image recognition device according to claim 1, further comprising an inputter that receives an input of a command for setting information indicating that the object is at least two objects in the hardware processor from an operator of the image recognition device, when the object captured in the image is at least two objects in a case where the hardware processor is made to perform the first process and the second process, wherein the hardware processor conducts machine learning, to perform a process of calculating a plurality of rectangular region candidates for a rectangular region circumscribing the object, for each of the at least two objects captured in the image, conducts machine learning, to calculate a classification probability indicating which of the rectangular region candidates a region candidate belongs to, for each of the region candidates, determines the rectangular region circumscribing the object from among the rectangular region candidates, for each of the at least two objects, conducts machine learning, to perform a process of calculating a likelihood that a region candidate is the region, for each of the region candidates, and determines the region belonging to the rectangular region from among the region candidates, for each of the two or more rectangular regions, in accordance with the classification probabilities of the region candidates belonging to the rectangular region candidate determined to be the rectangular region, and the likelihoods of the respective region candidates.

5. An image recognition method comprising:

conducting machine learning, to perform a first process of calculating a plurality of region candidates for a region showing a part of an object captured in an image, the part of the object being a portion where an outline of a recognition target is not clear, the part of the object that is the recognition target being recognized as a bounding box, and a second process of determining a size of each of the region candidates in accordance with the object captured in the image; and determining the region from among the region candidates, using a predetermined criterion.

6. A non-transitory computer readable medium storing instructions to cause a processor-controlled apparatus to perform the method of claim 5.

* * * * *